Figure 1:
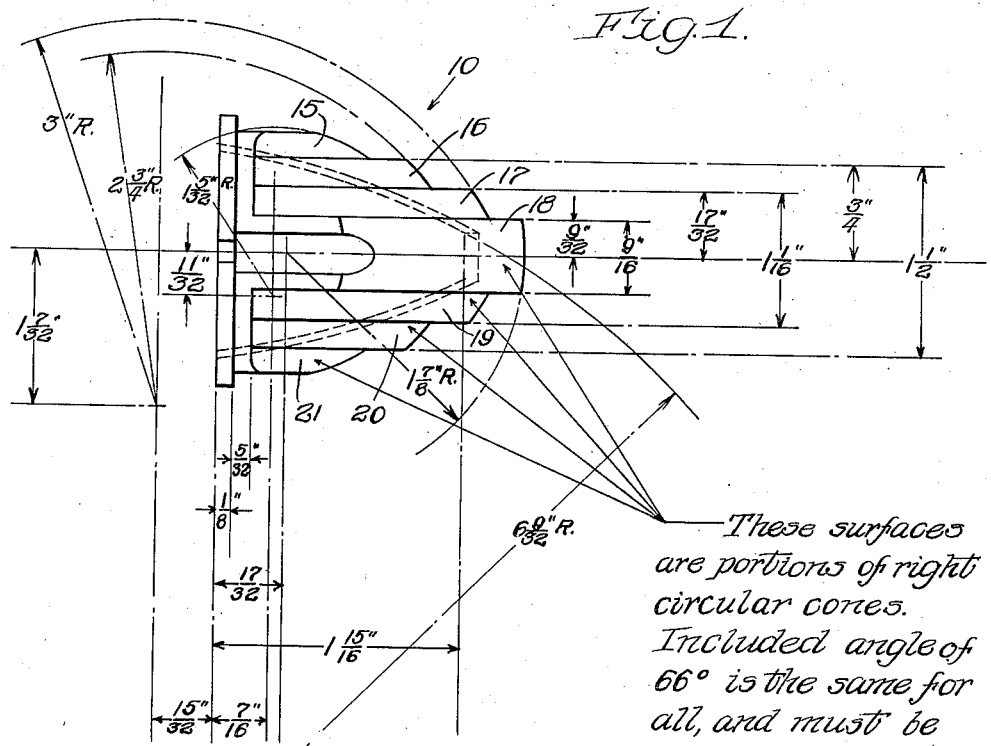

June 3, 1941.   H. R. GROSS   2,243,954
SIGNAL APPARATUS
Filed June 24, 1939   3 Sheets-Sheet 1

These surfaces are portions of right circular cones. Included angle of 66° is the same for all, and must be used in generating surfaces about centers shown.

Inventor:
Henry R. Gross,
By Chilton, Wiles, Davies, Harrell & Dawson,
Attys.

June 3, 1941. H. R. GROSS 2,243,954
SIGNAL APPARATUS
Filed June 24, 1939 3 Sheets-Sheet 2
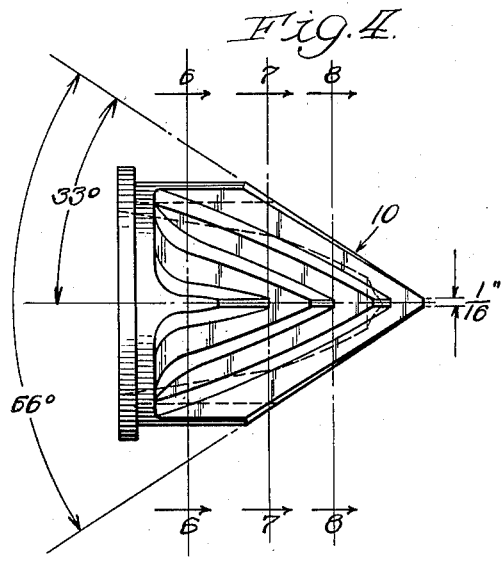
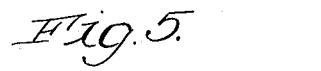
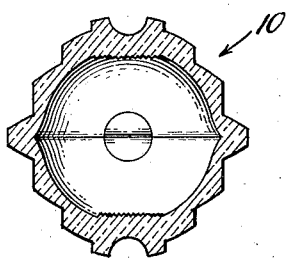
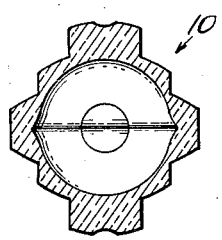
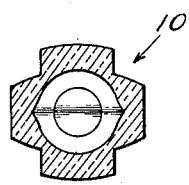
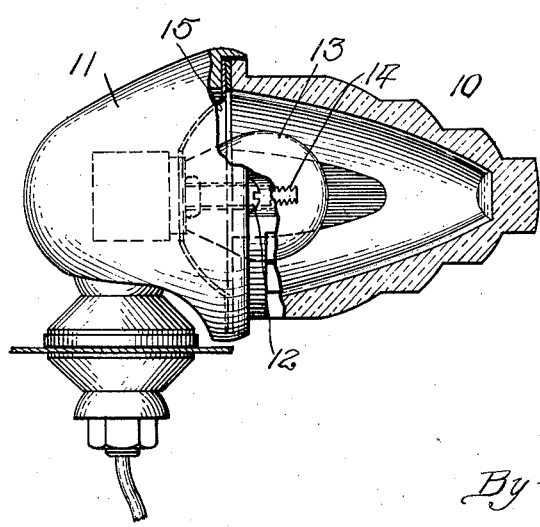
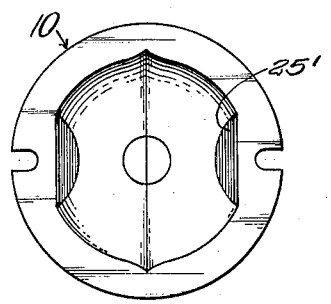
Inventor:
Henry R. Gross,
By Christy, Niles, Davis, Hirsch & Dawson
Attys.

June 3, 1941.        H. R. GROSS        2,243,954
SIGNAL APPARATUS
Filed June 24, 1939        3 Sheets-Sheet 3

Inventor:
Henry R. Gross,
By Chritton, Wiles, Davies, Hirsch & Dawson,
Attys.

Patented June 3, 1941

2,243,954

UNITED STATES PATENT OFFICE 2,243,954

SIGNAL APPARATUS

Henry R. Gross, Chicago, Ill.

Application June 24, 1939, Serial No. 281,039

1 Claim. (Cl. 177—329)

This invention relates to improvements in signal apparatus and more especially to such apparatus adapted for directional signaling use in connection with motor vehicles and the like.

It has been found highly desirable to provide directional signals on motor vehicles to indicate intended turns. My improved apparatus is designed for this purpose and is so made that it can be used on the front or rear or substantially any part of a motor vehicle. It is also so constructed that it is visible from two opposite sides.

My improved apparatus can be easily and quickly installed and so mounted as to operate to indicate either right or left turns. Heretofore it has frequently been thought necessary to make signaling devices of this kind, both right and left. My device, however, can be made to indicate right or left by the way it is mounted.

Another feature of my invention is the provision of a signal unit adapted for illumination by an electric lamp. My improved device is made of tranparent or translucent material, for example, glass, plastic, or the like, and is so constructed that, when illuminated from the rear or inside by an electric lamp, it will give a directional signal. The visibility of the signal is very high, even in bright daylight. The signal is produced by illuminating a reflecting surface or surfaces arranged, for example, in the form of an arrow pointing in the direction of the intended turn. This is accomplished by providing a substantially conical hollow lens with a source of light behind it or inside of it. A portion or portions of the inner face of the outer surface of the lens are adapted to reflect light rearwardly to give the directional signal. These reflecting surfaces are here shown arranged like a horizontal V or an arrow, with the point indicating either a right or left hand turn, as desired. The reflecting surface or surfaces are so bright that they stand out in contrast with the illumination of the rest of the lens and thereby form a clearly visible directional signal.

Other features and advantages of the invention will appear more fully as I proceed with my specification.

Figure 2:
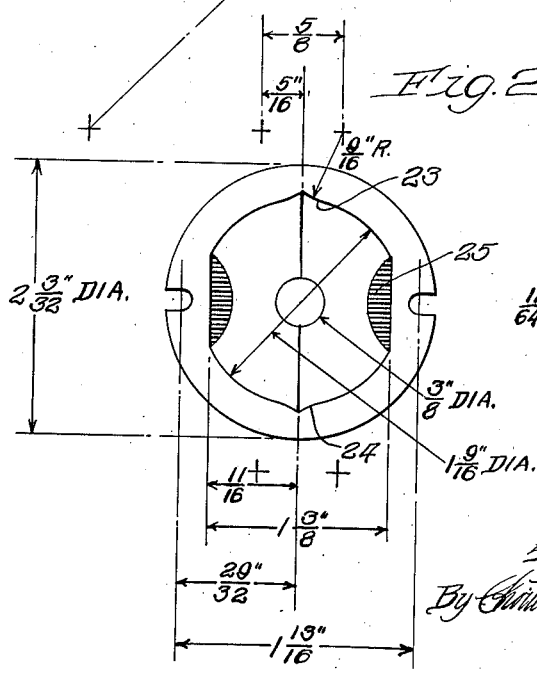
Figure 3:
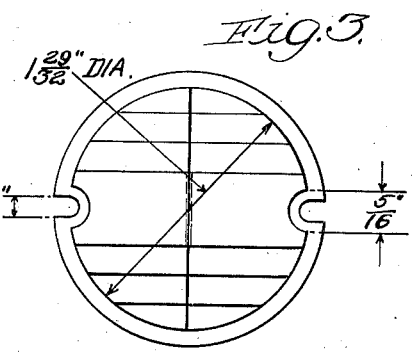

In that form of device embodying the features of my invention, shown in the accompanying drawings—Fig. 1 is a view in front or rear elevation; Fig. 2 is a view in end elevation looking toward the inside of the lens; Fig. 3 is a view in end elevation looking toward the base of the lens from the outside; Fig. 4 is a top plan view; Fig. 5 is a horizontal sectional view; Fig. 6 is a view taken as indicated by line 6 of Fig. 4; Fig. 7 is a view taken as indicated by line 7 of Fig. 4; Fig. 8 is a view taken as indicated by line 8 of Fig. 4; Fig. 9 is a view similar to Fig. 2 showing a modification; Fig. 10 is a view in side elevation of a complete lamp with the lens attached; and Figs. 11-14 are diagrammatic views showing the reflecting and refracting properties of the lens.

As shown in the drawings, the device comprises in general a hollow conical lens 10 made of any suitable transparent or translucent material such as glass, plastic, or the like. The material is preferably tinted amber in order to lessen the glare. As here shown, the lens 10 is mounted upon a suitable lamp 11 by means of the screws 12, 12. The lamp 11 carries a source of illumination, here shown as an ordinary incandescent electric bulb 13, the filament of which is indicated by 14. 15 indicates a reflector back of the bulb which is preferably spherical so that the filament is at the focus of the same in order to concentrate the light at the filament as much as possible. As here shown, the filament is located back of the apex of the lens 10 but actually inside of the same to a certain extent.

The principal feature of the lens is the provision of a reflecting surface or surfaces that will distinctly reflect the light of the filament rearwardly to show a definite directional signal. As here shown, I have provided fourteen such reflecting surfaces, seven of which are visible from one side and seven from the opposite side. It will simplify the explanation of the device to consider at the start one side only. As here shown, it will be seen that the lens is provided on each side with seven stepped or terraced surfaces 15—21 which are portions of right circular cones. These surfaces are indicated from the top to the bottom respectively by the reference numerals 15—21 in sequence, the center surface 18 being somewhat wider than the others. It is the extreme end of the inner face of each of these outer surfaces that constitutes the reflector. These reflecting surfaces, therefore, act as seven different reflectors, each of which reflects a bright spot or area from the filament rearwardly. The reflecting surfaces are arranged at such an angle that each reflects the light from the filament rearwardly in substantially the same direction. That is, the reflected rays from each of these reflecting surfaces are substantially parallel. Consequently, when viewed from the rear an observer will see seven reflections of the filament, or seven bright spots, in the shape of a horizontal V, or arrow, to give a directional signal to one side or the other, depending upon which way the lens is pointed.

As indicated by 22, I have shown a slight convexity near the apex of the cone inside to assist in concentrating rays and directing them against the reflecting surface 18. Also, I have provided similar convex portions 23 and 24 at the top and bottom of the cone respectively on the inside to assist in concentrating and directing the light against the reflecting surfaces 15, 16 and 17 at the top and 19, 20 and 21 at the bottom.

25 indicates corrugations on the side face of the cone to prevent a too direct view of the filament through the central portion of the cone.

The outer surfaces 15—21 are shown as slightly convex and this, of course, will give a concavity to the inner reflecting surface thereof.

It is to be understood that the lens reflects rearwardly and forwardly to the same extent and that the reflection forwardly is the same as that to the rear already described.

Figure 11:
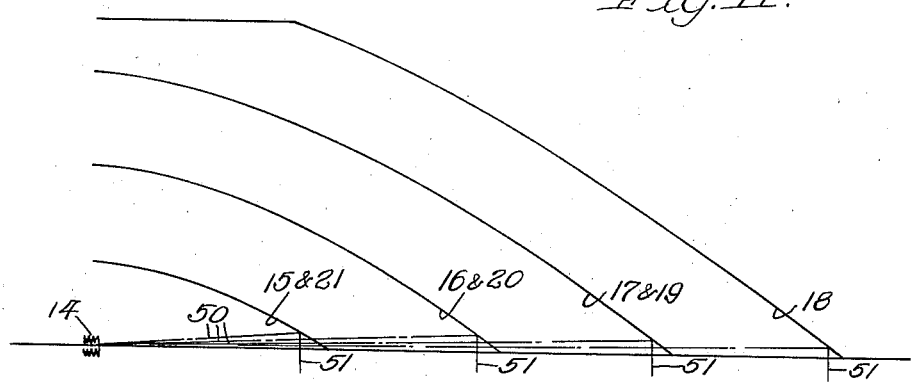
Figure 12:
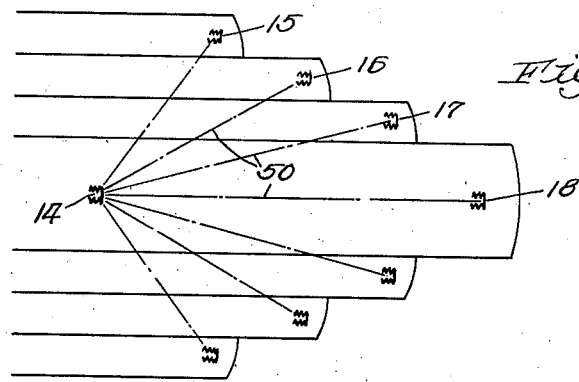
Figure 13:
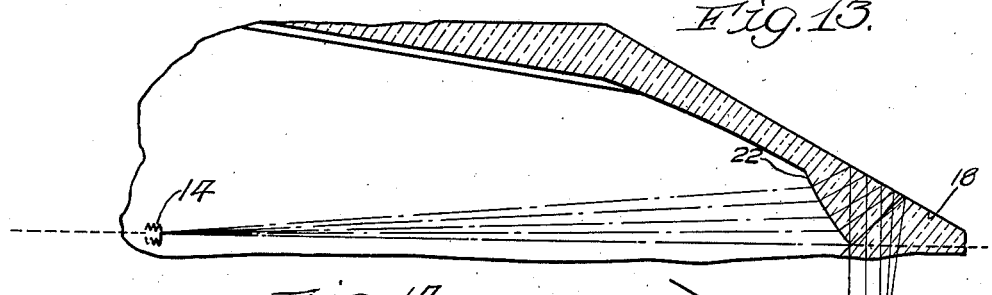

Fig. 12 shows diagrammatically how the signal appears when viewed from the rear. Each of the reflecting surfaces 15—21, inclusive, shows a reflection of the filament 14, and these reflections are in the form of a horizontal V pointing to the right (here shown), the surfaces 15—21 being portions of right circular cones having a right degree of curvature so that the rays 50 emanating from the filament 14 will be reflected rearwardly, substantially horizontally and parallel to each other. Fig. 11 shows diagrammatically the reflecting surfaces 15—21, inclusive when viewed from the top. It will be seen that these surfaces are so slanted that their outer ends will reflect the rays 50 emanating from the filament 14 rearwardly, substantially horizontally, and substantially parallel as indicated by the rays 51, 51. The rays 51 reflected from the surfaces 15 and 21 are above and below the ray reflected from the surface 18 as shown in Fig. 12, and likewise those reflected from the surfaces 16 and 20 are above and below the ray reflected from the surface 18, and likewise the rays reflected from the surfaces 17 and 19 are above and below, respectively, the ray reflected from the surface 18.

Figure 14:
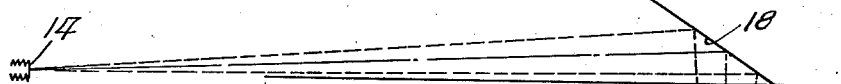

The convex surfaces 22 and 23 serve to aid in gathering more rays from the filament and directing them onto the reflecting surfaces than otherwise would be the case. It will be seen also that although in Figs. 11 and 12 I have indicated one reflection of the filament 14 seen from a certain position, that the reflecting surfaces are large enough so that some reflections will be seen even if the lens is viewed from different angles. For example, as indicated by Figure 14 it will be seen that there will be several images of the filament 14 on the reflecting surface 18 that will be seen from the rear even if the lens is viewed from different angles within a certain range. These surfaces may be made, for example, so that the directional signal will be effective if viewed anywhere within a predetermined angle, for example an angle of from 15°–30°.

If desired, certain portions of the lens can be made opaque as indicated by 25′ in Fig. 9 to prevent a direct view of the filament inside of the V.

As stated above, the end of the inner faces of the surfaces 15—21 constitute the reflecting surfaces. The reflections of the filament from each of these surfaces is confined substantially to the ends thereof because it is only at the ends that the reflected rays can go rearwardly and horizontally without intersecting or meeting the outer wall of the bore of the lens. That is, rays reflected rearwardly from the surfaces 15—21 inwardly of the ends will meet the outer wall of the interior of the lens itself and be scattered, dispersed, or reflected upwardly so that they will not be visible from a point occupied by a person in a following car to whom the signal is to be given.

While there are shown and described certain embodiments of the invention, it is to be understood that it is capable of many modifications. Changes, therefore, in the construction and arrangement may be made without departing from the spirit and scope of the invention as disclosed in the appended claims.

What I claim as new, and desire to secure by Letters Patent is:

Signal apparatus, including, a hollow lens generally conical in shape, with a light source adjacent the interior thereof, and with the outer surface of the lens terraced to provide separate surfaces so located as to form substantially the outline of an arrow, each of these separate surfaces being so angularly arranged with respect to light reaching it from the light source as to reflect an image of such light source in a horizontal direction and substantially perpendicular to the longitudinal axis of the lens, the reflected rays from each separate surface being substantially parallel to the reflected rays from the other separate surfaces.

HENRY R. GROSS.